(12) United States Patent
Jeong

(10) Patent No.: US 6,992,967 B2
(45) Date of Patent: Jan. 31, 2006

(54) HOLOGRAPHIC OPTICAL ELEMENT AND OPTICAL PICK-UP DEVICE USING THE SAME

(75) Inventor: Seong Yun Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 710 days.

(21) Appl. No.: 10/002,934

(22) Filed: Nov. 1, 2001

(65) Prior Publication Data

US 2003/0053392 A1    Mar. 20, 2003

(30) Foreign Application Priority Data

Sep. 20, 2001  (KR) ........................................ 2001-58176

(51) Int. Cl.
*G11B 7/00*    (2006.01)

(52) U.S. Cl. ................................ 369/112.1; 369/112.15

(58) Field of Classification Search ................ 369/103, 369/112.03, 112.05, 112.06, 112.1, 112.15, 369/112.16, 112.18, 121

See application file for complete search history.

(56) References Cited

U.S. PATENT DOCUMENTS 6,618,344 B1 * 9/2003 Funato ................... 369/112.15
6,643,245 B2 * 11/2003 Yamamoto et al. ..... 369/112.01

FOREIGN PATENT DOCUMENTS

CN    1115039 A    1/1996

* cited by examiner

*Primary Examiner*—Paul W. Huber
(74) *Attorney, Agent, or Firm*—Hong, Degerman, Kang & Schmadeka

(57)    ABSTRACT

An optical pick-up device uses a holographic optical element that includes a holographic optical element, formed by combining a birefringence medium and an isotropy medium, for adjusting an optical route of a transmitted beam according to a polarizing direction and wavelength of an incident beam. The optical pick-up device has an objective lens for focusing the beam pass through the holographic optical element on an optical disk according to the wavelength of such beam.

30 Claims, 5 Drawing Sheets

HOLOGRAPHIC OPTICAL ELEMENT AND OPTICAL PICK-UP DEVICE USING THE SAME

CROSS REFERENCE TO RELATED ART

This application claims the benefit of Korean Patent Application No. 58176/2001, filed on Sep. 20, 2001, which is hereby incorporated by reference in their entirety.

BACKGROUND OF THE INVENTION

1. Field of the Invention

The present invention relates to an optical pick-up device and more particularly, a holographic optical element in an optical pick-up device, which can record and reproduce data on optical disks of various formats.

2. Description of the Related Art

Recently, with an optical disk becoming a high-density and high capacity one, the configuration of an optical pick-up device has been developed in the direction of increasing the numerical aperture of an objective lens and reducing the wavelength of a laser beam in order to reduce the size of a beam for recording and reproducing it.

However, at this time, since the deterioration characteristic of a signal about the slant of a disk is inversely proportional to the wavelength of a laser, a tilt margin for the slant of a disk is reduced sharply as density is increased. Accordingly, in order to compensate the tilt margin, as the recording density of a disk is increased, the disk slant characteristic can be compensated by reducing the thickness of a disk board. For example, in a CD disk that has the capacity of 650 MB, laser wavelength is 780 nm and the numerical aperture of an objective lens is 0.45. Meanwhile, in a DVD disk, which has the capacity of 4.7 GB, laser wavelength is 560 nm and the numerical aperture is 0.6. The thickness of a disk in a CD is 1.2 mm and the DVD is 0.6 mm. Also, in the case of a HD disk, which has been developed recently, it has been suggested as a specification that wavelength be 405 nm and numerical aperture be 0.85. In this case, the disk thickness will be 0.1 mm that is a lot thinner, so the slant margin of a disk can be secured.

As the disk thickness is different according to a disk type, if other kinds of disks are recorded and reproduced with an optical pick-up device suited to only a certain type of disk, spherical aberration can be generated greatly clue to the thickness difference of a disk and the degradation of optic quality can occur. Thus, it will be difficult to record and reproduce a signal normally. For this reason, several methods have been suggested that can secure compatibility among the disks, which are different in the thickness of a board.

For example, the aberration shape, which is generated by using an optical pick-up device, which adopts an objective lens designed for a disk of 0.1 mm thickness (which is the HD disk) when a DVD disk of 0.6 mm thickness is reproduced, is shown in FIG. 1. The aberration value, which is converted into the rms value, is about 0.507 $\lambda$, but it is very short in Marechal Criterion that the aberration of an entire optical system should be below 0.07 $\lambda$. Accordingly, in order to compensate this phase, it has been suggested that an element should be made to have a phase value that is opposed to aberration when a beam having 650 nm wavelength has been incident therein.

In these methods, proposed are several methods that use a holographic optical element (HOE), which is an optical element that adjusts a phase by using the diffraction effect of a ray. FIG. 2 is a view illustrating a state of focusing a beam onto the HD disk and a DVD disk by using an optical pick-up device, in which a holographic optical element and an objective lens, which are designed for a related high-density disk, are adopted.

As shown in FIG. 2, the beam made to be focused onto a HD disk 23 and a DVD disk 24 through an objective lens 22 by controlling an optical route on a beam for DVD and a beam for the HD by using a holographic optical element 21. Here, the objective lens 22 is a lens designed to be suited for use in the HD. Also, the holographic optical element 21 is placed in front of the objective lens 22 and the characteristic of a beam is made to be unchanged by using the 0th ray for a beam of 405 nm wavelength, and for a beam of 650 nm wavelength, its spherical aberration can be compensated by using the $1^{st}$ ray.

FIG. 3 illustrates the diffraction efficiency of the 1st ray for use in DVD and the $0^{th}$ ray for use in HD according to the depth of a holographic optical device, in the case that a related holographic element is used in an adopted optical pick-up device. With reference to FIG. 3, the greater the diffraction efficiency of the $0^{th}$ ray in 405 nm wavelength is, the efficiency of the $1^{st}$ ray in 650 nm wavelength is decreased. According to this, if the efficiency of the 0th ray in 405 nm wavelength is designed to be large, the efficiency of the $1^{st}$ ray in 650 nm wavelength is decreased.

Also, provided is another method that uses the $1^{st}$ ray for both disks. In this case, the objective lens should not be designed with a lens for HD only, but it should be designed to be suited to the characteristic of a source ray that is used on both disks. FIG. 4 shows the diffraction efficiency of the 1st ray for DVD and the 1st ray for HD according to the depth of a holographic optical element in this case.

As shown in FIG. 4, since the points of indicating maximum efficiency according to the depth of a holographic optical element, are different, it is evident that it is difficult to achieve maximum efficiency for both kinds of disks. Also, a shortcoming occurs in that, if an appropriate intermediate value is taken, variation will be serious because of the great diffraction efficiency according to the depth variation.

In other words, when the $0^{th}$ ray and the $1^{st}$ ray are used, the efficiency of the 0th ray is substantially decreased if a holographic optical device is designed to have the greater efficiency for the 1st ray, and the efficiency of the 1st ray is substantially decreased if a holographic optical device is designed to have the greater efficiency for the $0^{th}$ ray, so there is no choice but to take appropriate intermediate value.

Also, because the wavelengths of two rays are different in the case that the $1^{st}$ ray is used for both disks, it is impossible to design both wavelengths to reach maximum efficiency simultaneously. Accordingly, in this case, the design is the same in that the holographic optical device is designed to have an appropriate intermediate value.

Accordingly, in the case of a general non-polarizing Hologram optical device, it is difficult to reach maximum value in diffraction efficiency for both wavelengths, so there is a limit in that some degree of optical loss occurs.

SUMMARY OF THE INVENTION

It is, therefore, an object of the present invention to provide an optical pick-up device using a holographic optical element which can record and reproduce data on a different disk which is a variety of an optical disk.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve the above object, there is provided an optical pick-up device using a holographic optical element includes a holographic optical element, formed by combining a birefringence medium and an isotropy medium, for adjusting an optical route of a transmitted beam according to a polarizing direction and wavelength of an incident beam; and an objective lens for condensing the beam coming through the holographic optical element into an optical disk appropriating to wavelength of each beam.

The birefringence medium and the isotropy medium, which forms the holographic optical element, are placed sequentially in the moving direction of the incident beam.

The birefringence medium shapes a concentric circle on a perpendicular plane in the moving direction of the beam, forms a saw tooth shape in a radial direction, and a plane of the saw tooth of the birefringence medium forms a boundary layer by being adhered closely to the isotropy medium.

The birefringence medium forms a slant face shaping the saw tooth according as height is changed corresponding to shape of stairs.

If the beam for a high-density disk and the beam for a low-density disk are incident into the holographic optical element, the birefringence medium is selected so that a reflective index (n1_high) for a high-density disk on the isotropy medium and a reflective index (ne_high) of an extraordinary ray for a low-density disk on the birefringence medium can be the same.

If the reflective index (n1_high) of the beam for the high-density disk on the isotropy medium and the reflective index (ne_high) of the extraordinary ray in the beam for the high-density disk on the birefringence medium is selected to be the same, a polarizing direction of the beam for the incident high-density disk is the same as that of the extraordinary ray.

If the reflective index (n1_high) of the beam for the high-density disk on the isotropy medium and the reflective index (ne_high) of the extraordinary ray in the beam for the high-density disk on the birefringence medium is selected to be the same, the polarizing direction of the beam for the incident low-density disk is perpendicular to that of the beam for the high-density disk and the moving direction of the beam.

If the beam for a high-density disk and the beam for a low-density disk are incident into the holographic optical element, the birefringence medium is selected so that a reflective index (n1_high) for a high-density disk on the isotropy medium and a reflective index (ne_high) of an ordinary ray for a low-density disk on the birefringence medium can be the same.

If the reflective index (n1_high) of the beam for the high-density disk on the isotropy medium and the reflective index (ne_high) of the ordinary ray in the beam for the high-density disk on the birefringence medium is selected to be the same, a polarizing direction of the beam for the incident high-density disk is the same as that of the ordinary ray.

If the reflective index (n1_high) of the beam for the high-density disk on the isotropy medium and the reflective index (ne_high) of the ordinary ray in the beam for the high-density disk on the birefringence medium is selected to be the same, the polarizing direction of the beam for the incident low-density disk is perpendicular to that of the beam for the high-density disk and the moving direction of the beam.

To achieve the above object, there is provided a holographic optical element, formed by combining a birefringence medium and an isotropy medium, for selecting a moving direction of a transmitted beam according to wavelength and a polarizing direction of an incident beam.

The birefringence medium and the isotropy medium are placed sequentially in the moving direction of the beam.

The birefringence medium is formed as the saw tooth shape in the radial direction on the perpendicular plane in the moving direction of the beam, the plane of the birefringence medium forms the boundary layer by being adhered closely to the isotropy medium.

The birefringence medium forms a slant face shaping the saw tooth according as height is changed corresponding to the shape of stairs.

According to the present invention, there is an advantage in that data can be recorded and reproduced with the compensation of spherical aberration for different kinds of disks and with the maximum efficiency of a beam by using a holographic optical element, in which birefringence medium is adopted.

It is to be understood that both the foregoing general description and the following detailed description are exemplary and explanatory and are intended to provide a further explanation of the invention as claimed.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

Figure 1:
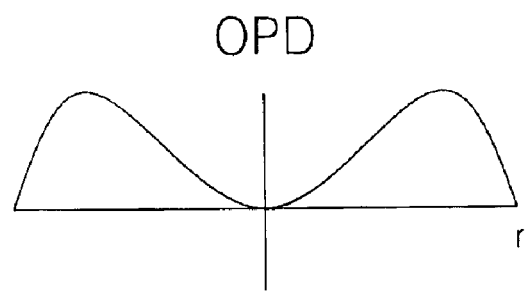
FIG. 1 is a view illustrating an example of an OPD curved line in the case of reproducing DVD by using an optical pick-up device, in which an objective lens that is designed to be suited for use in a high-density disk is adopted.
Figure 2:
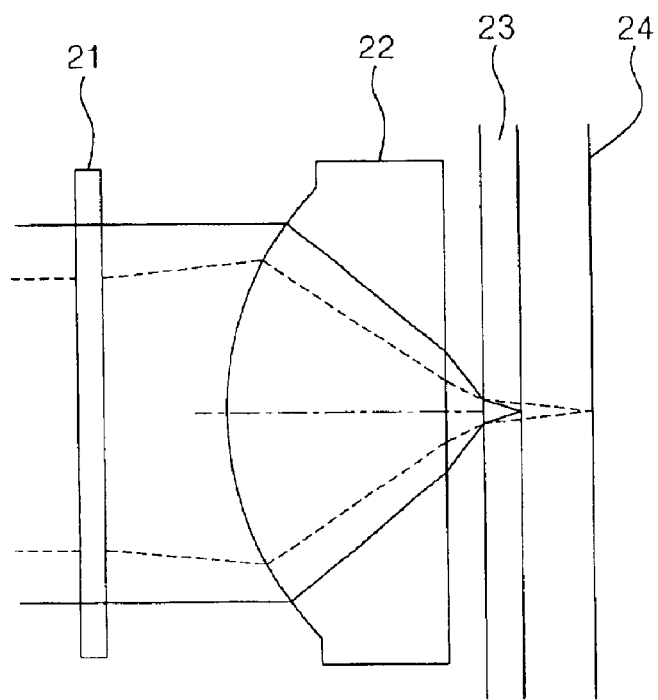
FIG. 2 is a view illustrating a state of condensing a beam into the HD disk and a DVD disk, by using an optical pick-up device, in which an objective lens and an holographic optical element that are designed to be s muted for a related high-density disk are adopted.
Figure 3:
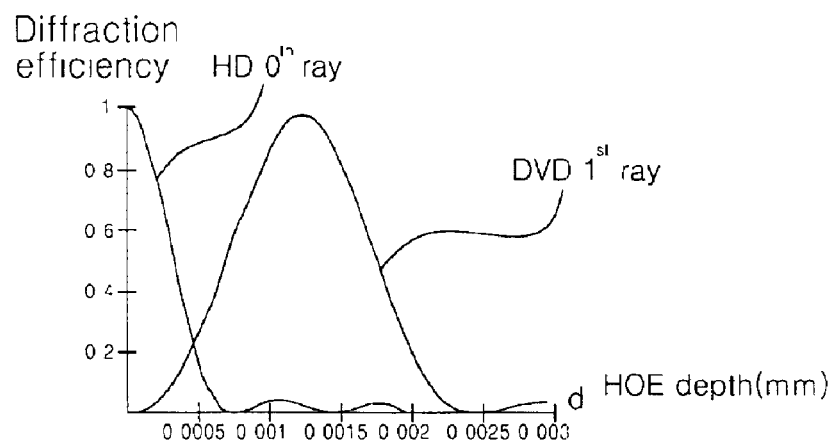
FIG. 3 is a view illustrating the diffraction efficiency of the $0^{th}$ ray for HD and the $1^{st}$ ray for DVD according to the depth of a holographic optical element, when using an optical pickup device, in which a related holographic optical element is adopted.
Figure 4:
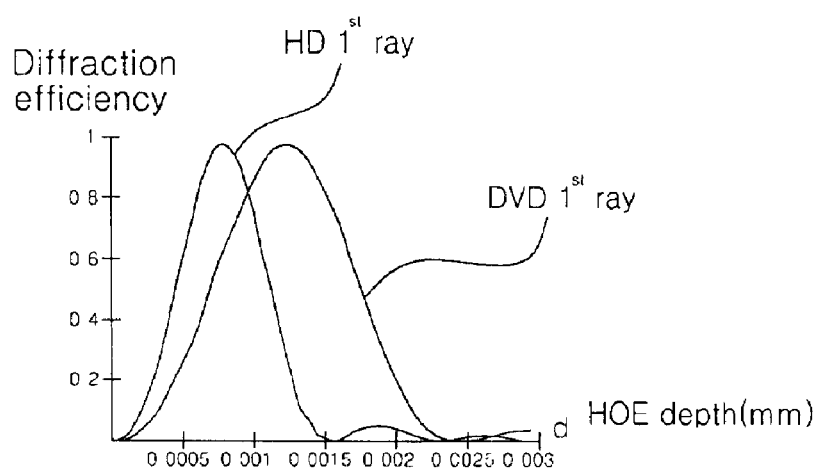
FIG. 4 is a view illustrating the diffraction efficiency of the $1^{st}$ ray for HD and the $1^{st}$ ray for DVD according to the depth of a holographic optical element, when using an optical pick-up device, in which a related holographic optical element is adopted.

A preferred embodiment of the present invention will now be described with reference to the accompanying drawings. In the following description, same drawing reference numerals are used for the same elements even in different drawings. The matters defined in the description such as a detailed constriction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 5:
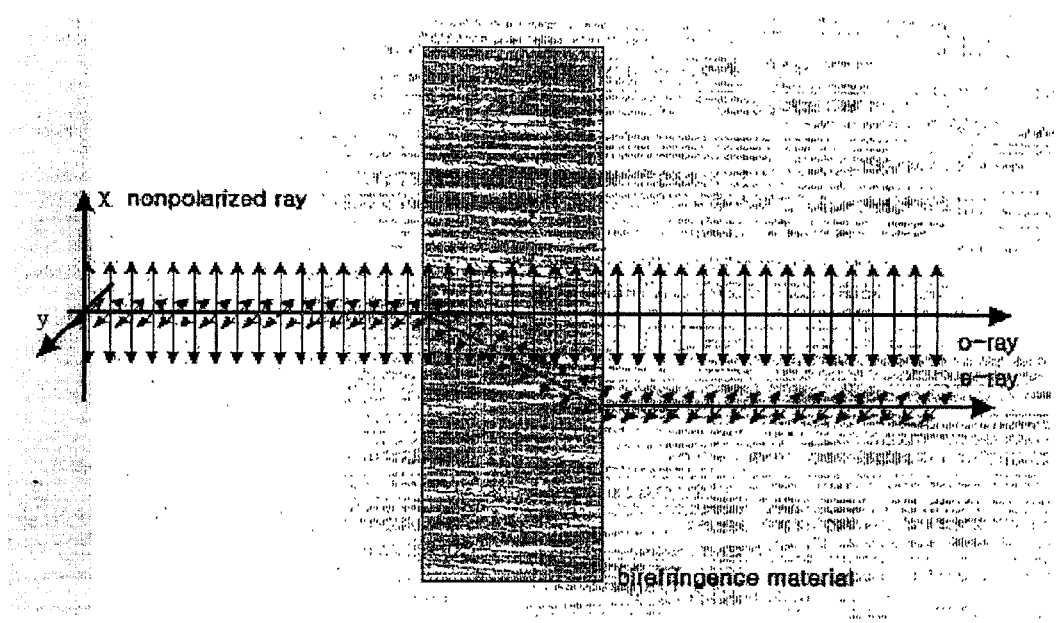
FIG. 5 is a view illustrating the moving direction of a beam through the birefringence medium.

In the present invention, a spherical aberration due to the difference of disk thickness is compensated by configuring a polarizing holographic optical element, in which birefringence medium is used. FIG. 5 shows a transmission characteristic for a polarized beam of birefringence medium. In particular, FIG. 5 is a view illustrating the moving direction of a beam which is transmitted in the case that a beam, which is polarized into a general birefringence medium, is incident.

If a polarized beam is incident into birefringence medium, the moving direction of a beam will be changed according to the polarizing direction of an incident beam. That is to say, as shown in FIG. 5, the route of a beam, which is polarized in the direction of x-axis on birefringence medium, doesn't change while passing birefringence medium, and this is called an ordinary ray. However, the route of a beam, which is polarized in the direction of y-axis on birefringence medium is changed more or less while passing birefringence medium and this is called an extraordinary ray.

Figure 6:
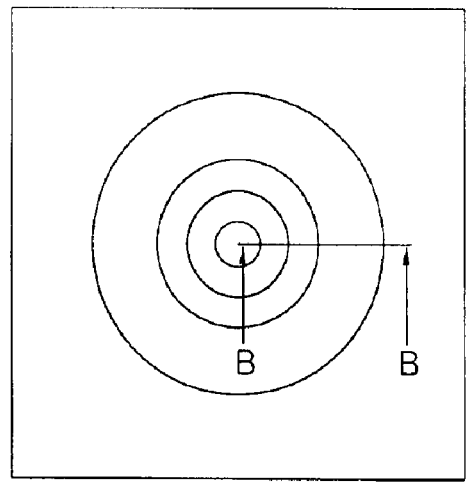
FIG. 6 is a view illustrating a perspective view of a shape of an incident face in the holographic optical element according to the preferred embodiment of the present invention.
Figure 7:
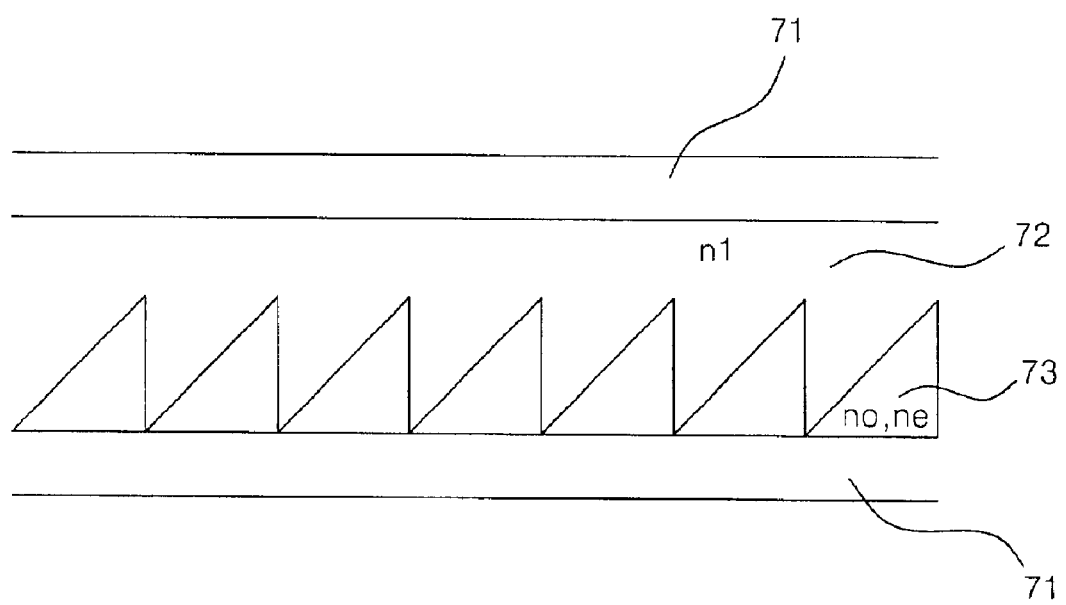
FIG. 7 is a view illustrating an example of a cross-sectional view along line B—B in FIG. 6.
Figure 8:
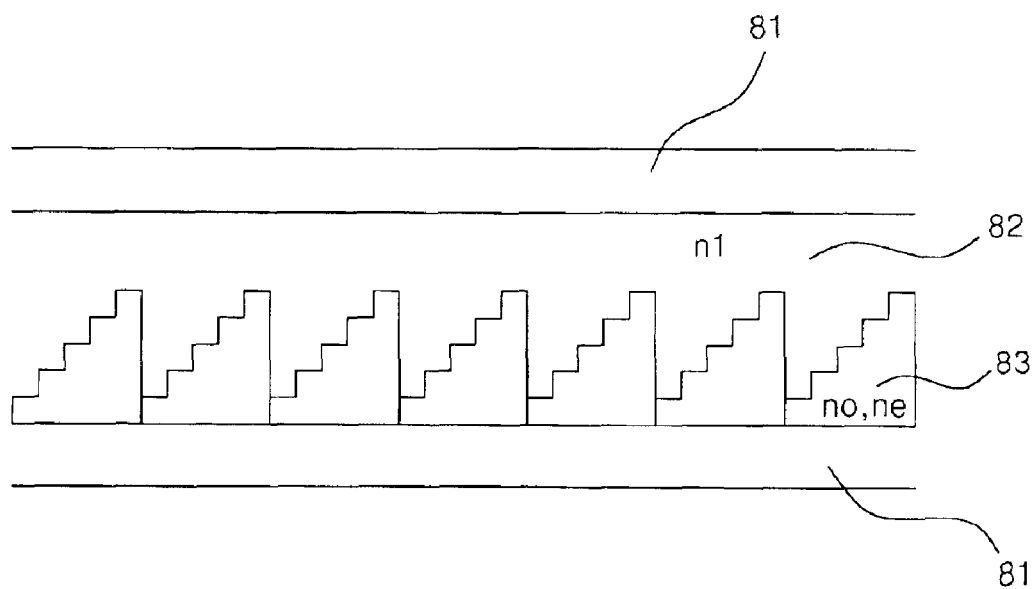
FIG. 8 is a view illustrating a different example of a cross-sectional view along line B—B in FIG. 6.

FIG. 6 through FIG. 8 illustrate a holographic optical element that uses birefringence medium according to the preferred embodiment of the present invention. FIG. 6 is a view illustrating a perspective view of a shape of an incident face in the holographic optical element according to this invention. Also, FIG. 7 and FIG. 8 are views illustrating examples of a cross-sectional view along line for B—B in FIG. 6.

As shown in FIG. 6 and FIG. 7, the birefringence medium 73, which forms a holographic optical element, and shapes a concentric circle about a perpendicular plane in the moving direction of a beam, and is formed like the shape of a saw tooth in the direction of radiation. The plane of the birefringence medium 73, which has the shape of a saw tooth, forms a boundary layer by being adhered to the isotropy medium 72. Here, the reference number 71 indicates a glass, in which the birefringence medium 73 and the isotropy medium 72 are formed.

Referring to FIG. 8, the birefringence medium 83, which forms a holographic optical element, has a slant face in a shape of a saw tooth. Preferably, the slant face has a stair-like structure with varying height. Also, the plane of the birefringence medium 83, which has the shape of a saw tooth, forms a boundary layer by being adhered to the isotropy medium 82. The reference number 81 indicates a glass, in which the birefringence medium 83 and the isotropy medium 82 are formed.

Figure 9:
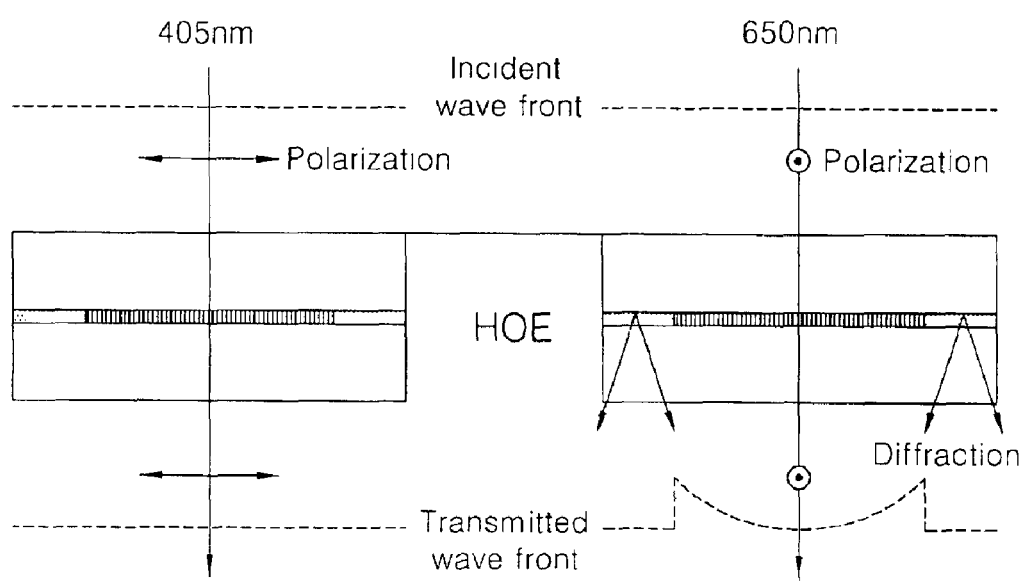
FIG. 9 is a view illustrating the figure of a transmitted beam according to the polarizing direction and the wavelength of a beam that is incident into a holographic optical element in an optical pick-up device that uses a holographic optical element according to the preferred embodiment of the present invention.

A compatibility of a variety of a disk for an optical pick-up device that uses a holographic optical device according to the present invention with reference to FIG. 7 through FIG. 9 is described. FIG. 9 is a view illustrating the figure of a transmitted beam according to the polarizing direction and the wavelength of a beam that is incident into a holographic optical element in an optical pick-up device that uses a holographic optical element according to this invention.

When the compatibility of a variety of a disk is described, the description will be an example in which a beam for HD (wavelength 405 nm) and a beam for DVD (wavelength 650 nm) are incident as a beam for a high-density disk and a beam for a low-density disk.

With reference to FIG. 7, the isotropy medium 72 is a material that has refractive index $n1\_405$ for wavelength 405 nm and refractive index $n1\_650$ for wavelength 650 nm. Also, birefringence medium 73 has refractive indexes $no\_405$ and $ne\_405$ for wavelength 405 nm according to the polarizing direction of an incident beam and refractive indexes $no\_650$ and $ne\_650$ for wavelength 650 nm according to the polarizing direction of an incident beam. Here no indicates refractive index for an ordinary ray and ne does that for an extraordinary ray. According to the preferred embodiment, the extraordinary ray is polarized ray, preferably by 90 degrees, with respect to the ordinary ray.

For example, according to an embodiment of the present invention, a holographic optical element is made by choosing the isotropy medium 72 and the birefringence medium 73, so that the $n1\_405$ and $ne\_405$ are preferably the same. If the polarizing direction of a 405 nm beam is incident to be the same as that of an extraordinary ray, the beam of wavelength 405 nm is transmitted without any effect since refractive indexes are the same in isotropy medium 72 and birefringence medium 73.

When the beam of wavelength 650 nm is incident and if the beam is incident by being polarized toward the direction (the polarized direction of an ordinary ray) perpendicular to the polarized direction of a beam of wavelength 405 nm, the refractive index is $n1\_650$ in the isotropy medium 72 and in the birefringence medium 73, the refractive index is $no\_650$. Accordingly, in the beam of wavelength 650 nm, different refractive indexes can be found in the isotropy medium 72 and the birefringence medium 73 and spherical aberration can be compensated since diffraction occurs by the shape of a holographic optical element on a slant face.

Referring to FIG. 9, in the case of the beam of wavelength 405 nm, the incident wave front and the transmitted wave front in a holographic optical element are propagated the same. However, in the case of the beam of wavelength 650 nm, the incident wave front in a holographic optical element is in a straight line, while the transmitted wave front in a holographic optical element is in a curved line. This effect is caused by diffraction that occurs in the boundary layers of the birefringence medium and the isotropy medium in a holographic optical element. Accordingly, the spherical aberration is appropriately compensated.

If the depth of the shape for a holographic optical element is adjusted appropriately, the diffraction efficiency of the beam of wavelength 650 nm could be maximized. Also, since there is no spatial phase change in the beam of wavelength 405 nm, the efficiency is maximized. According to the preferred embodiment of the present invention, a problem of losing the radiation intensity in a beam for a high-density disk and a beam for a low-density beam can be solved.

In another example, the beam of wavelength 650 nm, which is polarized in the same polarizing direction (the polarizing direction of an extraordinary ray) as the polarizing direction of wavelength 405 nm, is made to be incident on the holographic optical element shown in FIG. 9. Then, in the isotropy medium 72, refractive index becomes n1_650 and in the birefringence medium 73, refractive index becomes ne_650. Accordingly, in the beam of wavelength 650 nm, the refractive indexes are found differently in the isotropy medium 72 and the birefringence medium 73, and the spherical aberration can be compensated since diffraction occurs by the shape of a holographic optical element on a slant face.

According to an alternative embodiment of the present invention, a holographic optical element is made by choosing the birefringence medium 72 and the isotropy medium 72, so that the n1_405 and the no_405 are the same. If the polarizing direction of a beam of wavelength 405 nm is incident on the holographic optical element in the same as that of an ordinary ray, the beam of wavelength 405 nm can be transmitted without any effect because refractive indexes are the same in the isotropy medium 72 and the birefringence medium 73.

When a beam of wavelength 650 nm is incident on the holographic optical element and if such beam, which is polarized in the direction (the polarized direction of an extraordinary ray) perpendicular to the polarizing direction of the beam of wavelength 405 nm, is incident, the refractive index will be n1_650 in the isotropy medium 72, and reflective index will be ne_650 in the birefringence medium 73. Accordingly, in a beam in wavelength 650 nm, refractive indexes are found differently in the isotropy medium 72 and the birefringence medium 73 and spherical aberration can be compensated since diffraction occurs by the shape of a holographic optical element on a slant face.

According to the preferred embodiment of the present invention, if the depth of the shape of a holographic optical element is adjusted appropriately, the diffraction efficiency of the beam of wavelength 650 nm is maximized. Also, since there is no effect in the beam of wavelength 405 nm, the efficiency is maximized. Accordingly, a problem of losing the intensity of radiation in a beam for high-density disk and a beam for low-density beam can be solved.

In another example, the beam of wavelength 650 nm, which is polarized in the same polarizing direction (the polarizing direction of an ordinary ray) as the polarizing direction of wavelength 405 nm, is made to be incident on the holographic optical element shown in FIG. 9. Then, in the isotropy medium 72, the refractive index becomes n1_650 and in the birefringence medium 73, the refractive index becomes no_650. Accordingly, in a beam of wavelength 650 nm, the refractive indexes are found differently in the isotropy medium 72 and the birefringence medium 73 and spherical aberration are compensated since diffraction occurs by the shape of a holographic optical element on a slant face.

According to the present invention, the selection of the polarizing direction of a beam for a high-density disk and a beam for a low-density disk that are incident can be done simply using a laser diode which emits a beam that is pre-polarized. The laser diode is arranged by considering the polarizing direction of the emitted beam. As a result, the polarizing direction of a beam can be selectively adjusted by rotating the polarizing direction by using a λ/2 filter plate, or alternatively, simply rotating the laser diode.

Also, it is easy enough to design an objective lens just by considering optimum design suited to an optical system for a high-density disk. In other words, an objective lens is designed to be suited to an optical system for a high-density disk. Also, as for a problem of an optical system for a low-density disk, the spherical aberration can be compensated by a holographic optical element, so that there is convenience in configuring an optical system.

As described in the above, according to an holographic optical element and an optical pick-up device using the holographic optical element, there is an advantage in that by using a holographic optical element, in which a birefringence medium is adopted, the spherical aberration for a variety of a optical disk can be compensated and data can be recorded and reproduced by using the maximum efficiency of a beam.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An optical pick-up device, comprising:
   a light source that emits a light beam;
   a holographic optical element having a birefringence medium and an isotropy medium, for adjusting an optical route of the light beam according to a polarizing direction and wavelength of an incident beam; and
   an objective lens for focusing the light beam coming through the holographic optical element into an optical disk in response to a wavelength of the light beam,
   wherein the birefringence medium shapes a concentric circle on a perpendicular plane in the moving direction of the beam, forms a saw tooth shape in a radial direction, and a plane of the saw tooth of the birefringence medium forms a boundary layer by being adhered closely to the isotropy medium.

2. The device as set forth in claim 1, wherein the birefringence medium and the isotropy medium are sequentially placed in a moving direction of the light beam.

3. The optical pick-up device of claim 2, wherein the birefringence medium is in a concentric circle shape on a perpendicular plane in the moving direction of the light beam, and forms a saw tooth shape in a radial direction, and a plane of the saw tooth of the birefringence medium forms a boundary layer with the isotropy medium.

4. The optical pick-up device of claim 3, wherein the saw tooth shaped birefringence medium includes a stepped surface.

5. The optical pick-up device of claim 1, wherein if the light beam for a high-density disk is incident into the holographic optical element, the birefringence medium is selected so that a reflective index (n1_high) of the isotropy medium and a reflective index (ne_high) of an extraordinary ray of the birefringence medium are the same.

6. The optical pick-up device of claim 5, wherein if the refractive index (n1_high) of the isotropy medium for the light beam for the high-density disk and the refractive index (ne_high) of the birefringence medium of the extraordinary ray are selected to be the same, a polarizing direction of the light beam for the incident high-density disk is the same as that of the extraordinary ray.

7. The optical pick-up device of claim 5, wherein if the refractive index (n1_high) of the isotropy medium for the light beam for the high-density disk and the refractive index (ne_high) of the birefringence medium of the extraordinary ray are selected to be the same, the polarizing direction of the light beam for an incident low-density disk is perpendicular to that of the light beam for the high-density disk.

8. The optical pick-up device of claim 6, wherein if the refractive index (n1_high) of the isotropy medium for the light beam for the high-density disk and the refractive index (ne_high) of the birefringence medium of the extraordinary ray are selected to be the same, the polarizing direction of the light beam for an incident low-density disk is perpendicular to that of the light beam for the high-density disk.

9. The optical pick-up device of claim 5, wherein if the birefringence medium is selected so that the refractive index (n1_high) of the isotropy medium for the light beam for the high-density disk and the refractive index (ne_high) of the birefringence medium for the extraordinary ray in the light beam for the high-density disk are the same, diffraction efficiency of the light beam for the low-density disk is adjusted in response to a depth of the birefringence medium.

10. The optical pick-up device of claim 1, wherein if the light beam for a high-density disk is incident into the holographic optical element, the birefringence medium is selected so that a reflective index (n1_high) of the isotropy medium and a reflective index (ne_high) of an ordinary ray of the birefringence medium are the same.

11. The optical pick-up device of claim 10, wherein if the refractive index (n1_high) of the isotropy medium for the light beam for the high-density disk and the refractive index (ne_high) of the birefringence medium of the extraordinary ray are selected to be the same, a polarizing direction of the light beam for the incident high-density disk is the same as that of the ordinary ray.

12. The optical pick-up device of claim 10, wherein if the refractive index (n1_high) of the isotropy medium for the light beam for the high-density disk and the refractive index (ne_high) of the birefringence medium of the extraordinary ray are selected to be the same, the polarizing direction of the light beam for an incident low-density disk is perpendicular to that of the light beam for the high-density disk.

13. The optical pick-up device of claim 11, wherein if the refractive index (n1_high) of the isotropy medium for the light beam for the high-density disk and the refractive index (ne_high) of the birefringence medium of the extraordinary ray are selected to be the same, the polarizing direction of the light beam for an incident low-density disk is perpendicular to that of the light beam for the high-density disk.

14. The optical pick-up device of claim 11, wherein if the birefringence medium is selected so that the refractive index (n1_high) of the isotropy medium for the light beam for the high-density disk and the refractive index (ne_high) of the birefringence medium for the extraordinary ray in the light beam for the high-density disk are the same, diffraction efficiency of the light beam for the low-density disk is adjusted in response to a depth of the birefringence medium.

15. An optical pick-up device, comprising:
a light source that emits a first light beam having a first predetermined wavelength;
a holographic optical element having a birefringence medium and an isotropy medium, for adjusting an optical route of the first light beam according to a polarizing direction and wavelength, wherein the isotropy medium has at least first and second isotropy refractive indexes, and the birefringence medium has first and second ordinary refractive indexes and first and second extraordinary refractive indexes in response to the wavelength of the first light beam; and
an objective lens for focusing the first light beam coming through the holographic optical element on an optical disk in response to a wavelength of the first light beam
wherein the first isotropy refractive index is substantially the same as the first extraordinary refractive index.

16. The optical pick-up device of claim 15, wherein the first isotropy refractive index is substantially the same as the first ordinary refractive index.

17. The optical pick-up device of claim 15, wherein the second isotropy refractive index is different from the second extraordinary refractive index.

18. The optical pick-up device of claim 15, wherein the second isotropy refractive index is different from the second ordinary refractive index.

19. The optical pick-up device of claim 15, wherein the first isotropy refractive index is substantially the same as the first ordinary refractive index.

20. The optical pick-up device of claim 19, wherein the second isotropy refractive index is different from the second extraordinary refractive index.

21. The optical pick-up device of claim 20, wherein the second isotropy refractive index is different from the second ordinary refractive index.

22. The optical pick-up device of claim 15, wherein the first light beam having the first predetermined wavelength polarized in a first direction passes through the isotropy medium while being subjected to the first isotropy refractive index and passes through the birefringence medum while being subjected to the first ordinary refractive index.

23. The optical pick-up device of claim 15, wherein the first light beam having the first predetermined wavelength polarized in a first direction passes through the isotropy medium while being subjected to the first isotropy refractive index and passes through the birefringence medum while being subjected to the first extraordinary refractive index.

24. The optical pick-up device of claim 15, wherein when the light source emits a second light beam having a second predetermined wavelength polarized in a second direction, the second light beam passes through the isotropy medium while being subjected to the second isotropy refractive index and passes through the birefringence medum while being subjected to the second ordinary refractive index.

25. The optical pick-up device of claim 15, wherein when the light source emits a second light beam having a second predetermined wavelength polarized in a second direction, the second light beam passes through the isotropy medium while being subjected to the second isotropy refractive index and passes through the birefringence medum while being subjected to the second extraordinary refractive index.

26. The optical pick-up device of claim 15, wherein the birefringence medium is in a concentric circle shape having a substantially saw tooth cross-sectional shape, the concentric circle shape arranged on a plane substantially perpendicular to a light beam travel path, and wherein the birefringence medium abuts against the isotropy medium.

27. A holographic optical element for use in an optical pick-up device having a light source that emits a first light beam having a first predetermined wavelength and an objective lens for focusing the first light beam coming through the holographic optical element on an optical disk in response to a wavelength of the first light beam, the holographic optical element comprising:
a birefringence medium and an isotropy medium, for adjusting an optical route of the first light beam according to a polarizing direction and wavelength, wherein the isotropy medium has at least first and second isotropy refractive indexes, and the birefringence medium has first and second ordinary refractive indexes and first and second extraordinary refractive indexes in response to the wavelength of the first light beam
wherein the first isotropy refractive index is substantially the same as the first extraordinary refractive index.

28. The holographic optical element of claim 27, wherein the first isotropy refractive index is substantially the same as the first ordinary refractive index.

29. The holographic optical element of claim 27, wherein the second isotropy refractive index is different from the second extraordinary refractive index.

30. The holographic optical element of claim 27, wherein the second isotropy refractive index is different from the second ordinary refractive index.

* * * * *